(12) United States Patent
Gross

(10) Patent No.: US 10,155,689 B2
(45) Date of Patent: Dec. 18, 2018

(54) GLASS WITH HIGH FRICTIVE DAMAGE RESISTANCE

(71) Applicant: CORNING INCORPORATED, Corning, NY (US)

(72) Inventor: Timothy Michael Gross, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 4 days.

(21) Appl. No.: 15/134,569

(22) Filed: Apr. 21, 2016

(65) Prior Publication Data

US 2016/0229740 A1 Aug. 11, 2016

Related U.S. Application Data

(62) Division of application No. 13/101,373, filed on May 5, 2011, now Pat. No. 9,346,709.

(51) Int. Cl.
*C03C 17/28* (2006.01)
*C03C 17/30* (2006.01)
(Continued)

(52) U.S. Cl.
CPC ............... *C03C 17/30* (2013.01); *C03C 3/04* (2013.01); *C03C 4/18* (2013.01); *C03C 15/00* (2013.01); *C03C 17/28* (2013.01); *C03C 21/002* (2013.01); *C03C 2204/00* (2013.01); *C03C 2217/78* (2013.01); *C03C 2218/112* (2013.01); *C03C 2218/31* (2013.01); *Y10T 428/26* (2015.01);
(Continued)

(58) Field of Classification Search
None
See application file for complete search history.

(56) References Cited

U.S. PATENT DOCUMENTS 3,577,256 A 5/1971 Benford et al.
4,287,018 A 9/1981 Gulati et al.
(Continued)

FOREIGN PATENT DOCUMENTS

CN 1369449 A 9/2002
WO 1995000259 A2 1/1995
(Continued)

OTHER PUBLICATIONS

Patent Cooperation Treaty International Notification of Transmittal of the International Preliminary Report of Patentability Report on Patentability (Chapter I of the Patent Cooperation Treaty) of the International Searching Authority, international application No. PCT/US2012/036431: dated Nov. 14, 2013, 8 pages.
(Continued)

*Primary Examiner* — David Sample
(74) *Attorney, Agent, or Firm* — Kevin M. Johnson

(57) ABSTRACT

A glass article exhibiting improved resistance to frictive surface damage and a method for making it, the method comprising removing a layer of glass from at least a portion of a surface of the article that is of a layer thickness at least effective to reduce the number and/or depth of flaws on the surface of the article, and then applying a friction-reducing coating to the portion of the article from which the layer of surface glass has been removed.

8 Claims, 1 Drawing Sheet

(51) Int. Cl.
*C03C 21/00* (2006.01)
*C03C 15/02* (2006.01)
*C03C 15/00* (2006.01)
*C03C 3/04* (2006.01)
*C03C 4/18* (2006.01)

(52) U.S. Cl.
CPC ...... *Y10T 428/265* (2015.01); *Y10T 428/3154* (2015.04); *Y10T 428/31544* (2015.04); *Y10T 428/31612* (2015.04)

(56) References Cited

U.S. PATENT DOCUMENTS

| | | | |
|---|---|---|---|
| 4,544,395 A | | 10/1985 | Evans |
| 4,880,453 A | * | 11/1989 | Coppola ................. C03C 3/072 216/34 |
| 5,415,927 A | | 5/1995 | Hirayama et al. |
| 5,804,317 A | | 9/1998 | Charrue |
| 6,233,972 B1 | | 5/2001 | Foster et al. |
| 6,379,746 B1 | | 4/2002 | Birch et al. |
| 6,406,777 B1 | | 6/2002 | Boss et al. |
| 6,491,972 B1 | | 12/2002 | Weber et al. |
| 6,673,752 B2 | | 1/2004 | Bookbinder et al. |
| 6,689,414 B2 | | 2/2004 | Weber et al. |
| 6,767,579 B1 | | 7/2004 | Bookbinder et al. |
| 6,790,532 B1 | | 9/2004 | Gier et al. |
| 2009/0110914 A1 | | 4/2009 | Zhuang et al. |
| 2009/0197048 A1 | | 8/2009 | Amin et al. |
| 2010/0047466 A1 | | 2/2010 | Buck et al. |
| 2010/0075577 A1 | * | 3/2010 | Kojima ................. B24B 37/042 451/41 |
| 2010/0279067 A1 | * | 11/2010 | Sabia ................... C03B 17/064 428/141 |
| 2010/0307552 A1 | | 12/2010 | Kohnke et al. |
| 2012/0052302 A1 | * | 3/2012 | Matusick ................ C03C 15/00 428/410 |

FOREIGN PATENT DOCUMENTS

| | | |
|---|---|---|
| WO | 1995000259 A3 | 1/1995 |
| WO | 2012027133 A2 | 3/2012 |

OTHER PUBLICATIONS

Patent Cooperation Treaty International Notification of Transmittal of the International Search Report and the Written Opinion of the International Searching Authority, international application No. PCT/US2012/036431: dated Jul. 17, 2012, 11 pages.

Anthony C. Fischer Cripps, Introduction to Contact Mechanics, Springer Publishing, New York, 2010.

Varshneya, Arun, "Strengthening and Toughening," Fundamentals of Inorganic Glasses, 2006, pp. 513-521.

* cited by examiner

GLASS WITH HIGH FRICTIVE DAMAGE RESISTANCE

CROSS-REFERENCE TO RELATED APPLICATIONS

This application is a divisional application and claims the benefit of priority under 35 U.S.C. § 120 of U.S. application Ser. No. 13/101,373 filed on May 5, 2011, the content of which is relied upon and incorporated herein by reference in its entirety.

BACKGROUND

Field of the Disclosure

The present disclosure relates generally to glass articles and surface treatments for such articles, and more particularly to glass articles that have been surface-treated to exhibit enhanced strength and resistance to surface scratching damage.

Technical Background

Glass surfaces that are not provided with some form of surface protection are highly susceptible to damage from elastic sliding contacts. Such damage, referred to in the art as frictive damage, can range from visible surface scratches to surface flaws that, even if small, can significantly degrade the strength of the glass. Reduced flexural strength as measured by 3- or 4-point flexural modulus of rupture strength testing is one result of such damage.

Susceptibility to frictive damage is not limited to so-called soft (e.g., soda lime) glasses, but is exhibited by harder glasses as well, including but not being limited to the higher-melting aluminosilicate glasses presently preferred for use in advanced displays and other technical applications. Further, tempering methods designed to increase glass strength by developing compressive surface stresses in the glass provide little, or at best only slight, improvements in resistance to frictive damage; thus tempered glasses remain susceptible to such damage.

One known approach for improving the resistance of glass surfaces to flawing that can cause weakening or breakage of glass articles is to apply a protective coating to the glass prior to use. Both inorganic and organic coating materials, including such diverse materials as liquid-applied polymers and vapor-deposited or sintered powder coatings of inorganic compounds or mixtures have been tried. However, while many of these coating methods offer at least short-term protection from sliding contact damage, none of them provides permanent protection nor do any of them effect an improvement in the initial strength of a glass surface to be protected.

SUMMARY

In accordance with the present disclosure, methods for protecting glass articles against strength losses resulting from frictive surface damage are provided. The disclosed methods can provide glass articles of enhanced initial strength that additionally exhibit good resistance to strength deterioration from sliding contact damage. The combination of enhanced strength and enhanced scratch resistance is of particular value for currently marketed electronic display devices that provide touch-screen functionality, i.e., device control via sliding or touching contact with an electronically active display surface using a stylus, skin contact, or the like.

In one aspect, therefore, the disclosure includes a method for improving the fictive damage resistance of a glass article comprising an initial step of removing a layer of glass from at least a portion of a surface of the article. The layer that is removed is of a thickness at least effective to reduce the number and/or depth of flaws on the surface of the article. Thereafter, a friction-reducing coating is applied to at least the surface portion from which the layer of glass has been removed.

Any of a wide variety of chemical compounds can be used to form the friction-reducing coating on the etched surface portion of the article. In particular embodiments, the friction-reducing coating will be applied from a coating formulation capable of forming at least one lubricous coating selected from the group consisting of (a) coatings comprising an amphiphobic fluorine-based surface layer chemically bonded to the surface of the glass substrate; (b) hydrophobic coatings deposited from heat-vaporized aqueous surfactant solutions; (c) covalently bonded coatings comprising at least one organic species selected from the group of silanes, siloxanes, silanols, and cationic phosphonium compounds; (d) self-assembled monolayer coatings comprising hydrocarbon-functional or fluorocarbon-functional silane monomers or oligomers; and (e) organic polymeric coatings bonded to the chemically etched surface of the article via van der Waal forces.

In certain embodiments, the methods disclosed herein will comprise additional steps. Thus methods are disclosed comprising first subjecting at least a portion of a surface of the glass article to a tempering treatment to develop a compressive surface layer thereon. Thereafter a layer of glass is removed from the compressive surface layer that is of a thickness at least effective to reduce the number and/or depth of flaws in the compressive surface layer. Depending on the thickness of the removed layer, a slight reduction in the level of compressive stress can be measured in the remaining surface, but the thickness of the removed layer will be in any case be insufficient to eliminate the surface compression resulting from the tempering step. A friction-reducing coating is then applied to the residual compressive surface layer.

In other aspects, the present disclosure provides a glass article exhibiting high resistance to frictive surface damage. That article comprises a glass substrate having a chemically etched surface free of deep surface flaws and a friction-reducing coating disposed on the etched surface. In particular embodiments, the glass articles will comprise a chemically etched surface that is substantially free of surface flaws of a depth exceeding 2 μm.

In accordance with these or other of the disclosed embodiments the friction-reducing coating is selected from the group of coatings described above; i.e., consisting of (a) coatings comprising an amphiphobic fluorine-based surface layer chemically bonded to the surface of the glass substrate; (b) hydrophobic coatings deposited from heat-vaporized aqueous surfactant solutions; (c) covalently bonded coatings comprising at least one organic species selected from the group of silanes, siloxanes, silanols, and cationic phosphonium compounds; (d) self-assembled monolayer coatings comprising hydrocarbon-functional or fluorocarbon-functional silane monomers or oligomers; and (e) organic polymeric coatings bonded to the chemically etched surface of the article via van der Waal forces.

DESCRIPTION OF THE DRAWINGS

The methods and articles provided in accordance with the present disclosure are described in further detail below with reference to the appended drawings, wherein.

DETAILED DESCRIPTION

While the methods and articles provided in accordance with the present disclosure have application to a wide variety of glass types, articles and compositions, they may be applied with particular benefit to the production of strong, damage resistant glass sheets such as increasingly used for consumer information display devices. Such devices include televisions, computer displays, and handheld devices such as pad computers and cellular telephones. Accordingly, some of the illustrative embodiments of the present methods and articles set forth below are described with specific reference to such products even though the disclosed methods and the resulting articles are not limited thereto.

As the art is aware, frictive surface damage arising in glass articles is generally the result of handling during manufacture or while in use, and is not limited to glass articles of any particular composition, type, or method of manufacture. For example, frictive damage can be observed in both unstrengthened glasses and glasses subjected to strengthening treatments (e.g., tempering) during manufacture, even though the latter glasses may have high compressive surface stresses that significantly increase the undamaged flexural strengths thereof.

Figure 1:
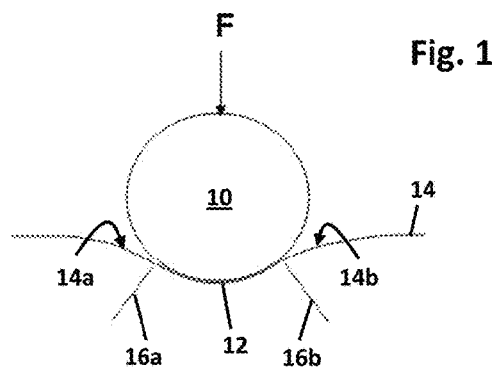
FIG. 1 schematically illustrates a mechanism by which ring and cone cracks may form in a glass surface.

The mechanism by which surface pressures produce so-called ring cracks in glass is schematically illustrated in FIG. 1 of the drawings. Ring cracks are the single point analog to the groups of cracks that can form during sliding contact with a glass surface.

As schematically shown in FIG. 1, a downward force F applied, for example, by a stylus point 10 forms a spherical depression 12 in a glass surface 14. The resulting tensile stresses arising at locations such as 14a and 14b around the periphery of the depression give rise to circular or ring cracking around that depression, the resulting crack then propagating into the body of the glass in directions such as 16a and 16b to form a defect termed a cone crack.

Figure 3:
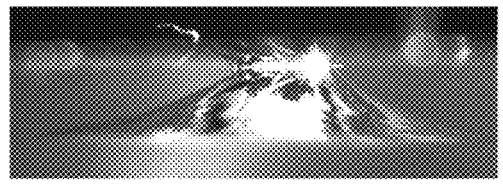
FIG. 3 illustrates a cone crack in a glass surface as seen through a polished cross-section of a glass sample.
Figure 2:
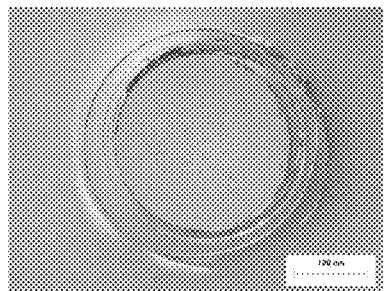
FIG. 2 illustrates a ring crack in a glass surface.

Susceptibility to ring and cone cracking is increased in proportion to the number and size of surface flaws present in a glass surface, such flaws typically being formed as the glass is handled during manufacture or in use. A glass with a high concentration of surface flaws will generally require a lower load to initiate ring cracks. FIG. 2 of the drawings is a photomicrograph presenting a top surface view of a ring crack in a glass sheet. FIG. 3 is a photomicrograph presenting a side cross-sectional view of a cone crack that has propagated from a ring crack into the body of such a glass sheet.

A glass that has a higher ring cracking threshold is also more resistant to sliding frictive damage. Thus the propensity of a glass surface to suffer frictive type damage originating from surface flaws can be estimated by evaluating its resistance to ring cracking. This can be done by making a number of single point ball indentations in the surface of a glass test panel at various locations and over a range of indentation forces, and recording the loads at which ring cracking occurs. Cracking load data collected in this manner confirm that the generally high resistance of chemically strengthened glasses to ring cracking can be further increased if glass surface layers of the thicknesses prescribed in accordance with the present disclosure are first removed therefrom.

Figure 4:
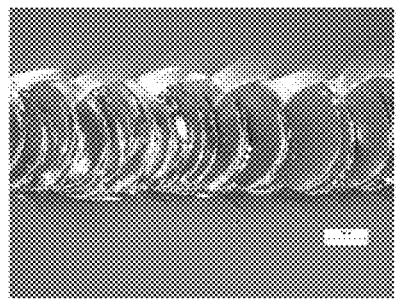
FIG. 4 illustrates frictive cracking damage cause by sliding contact with a glass surface.

In the case of sliding contact, the elastic tensile stresses arising from such contact acting upon surface flaws to initiate crescent-shaped frictive-type cracks or "chatter marks" in glasses. Sliding elastic contact produces frictive surface damage in the form of a trail of crescent shaped cracks in the glass surface as shown in FIG. 4 of the drawings. The damage occurs from the elastic tensile stresses arising at the glass surface just outside of the region of contact between a sliding body and the glass. The stress is greatest in the region trailing the sliding body.

In accordance with the present disclosure, the strength and therefore the utility of a glass article such as a glass sheet—e.g., of the type used for information displays—are significantly improved through the use of a flaw reduction step followed by a lubricious protective coating step. The first step is effective to reduce the number and size of surface flaws in the article and the second step is effective to reduce the coefficient of friction of the surface of the article under sliding contact with foreign objects.

Figure 5:
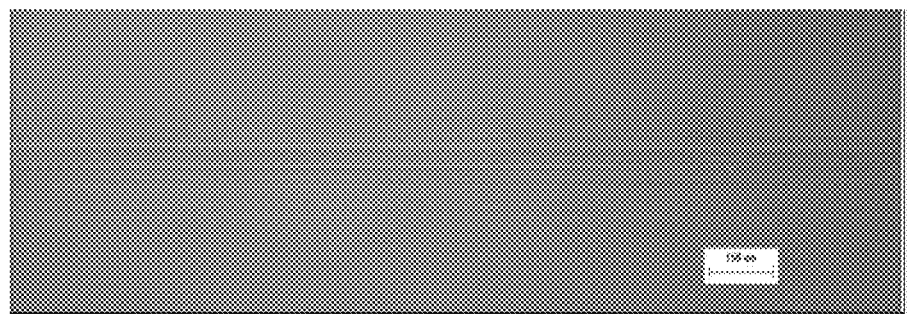
FIG. 5 depicts a damage-resistant glass surface provided in accordance with the present disclosure.

The effectiveness of the methods of the present disclosure for preventing frictive surface damage such as shown in FIG. 4 is shown in FIG. 5 of the drawings. FIG. 5 is a top surface view of a chemically strengthened glass sheet sample subjected to flaw reduction via surface layer removal and then provided with a friction-reducing coating consisting of an amphiphobic fluorine-based surface layer in accordance with the present disclosure. The glass sample has suffered no frictive surface damage following sliding surface contact by a stylus comprising a 2 mm ball point under a 20 kilogram load.

As noted above, surface flaw populations and sizes can be reduced by removing a thin surface layer from the surface of a glass article, most effectively by chemically dissolving the glass. In particular embodiments the step of removing the surface layer of glass is carried out by contacting the surface or a selected portion thereof with a glass etching medium, a suitable medium for the purpose being an aqueous acidic fluoride solution. In further embodiments, the treatment selected for surface removal is one that can effect the removal of a surface layer of a thickness at least sufficient to reduce the maximum depth of any residual surface flaws to a value not exceeding about 2 µm.

In carrying out the necessary surface removal, it is necessary to preserve the inherent or enhanced strength of the article. In addition, where the glass article is a glass plate or sheet intended for use in an information display application, the optical surface quality of the article must be preserved. For that reason it is necessary to limit the thickness of the glass surface layer removed, and therefore, in particular embodiments, the layer of glass removed has a thickness in the range of 1-5 µm. Removing more glass risks compromising residual strength or glass surface quality, while removing less glass is ineffective to achieve the required reduction in surface flaw populations and depths.

The disclosed procedures for controlling surface flaw levels can be used to decrease the likelihood of surface damage in tempered or strengthened glasses as well as in unstrengthened glasses. As noted above, a suitable method for providing a strengthened glass article with improved resistance to fictive surface damage comprises subjecting at least a portion of a surface of a glass article to a tempering treatment to develop a compressive surface layer thereon, then removing a layer of glass from the compressive surface layer of a thickness at least effective to reduce the number and/or depth of flaws in the compressive surface layer (i.e., the thickness removed is at a minimum sufficient to effectively reduce the number and depth of flaws in the compressive surface layer), and then applying a friction-reducing coating to the compressive surface layer.

In accordance with some embodiments of that method, the step of subjecting at least the portion of the surface of the glass article to the tempering treatment comprises subjecting the glass article to an ion-exchange strengthening treatment. A wide variety of methods for chemically tempering glass articles via chemical (ion-exchange) strengthening are known. These include methods involving contacting the glass at temperatures below the glass strain point with sources of exchangeable ions (e.g. potassium ions) that are larger than the ions present in the glass prior to treatment (e.g. sodium ions), as well as contacting the glass at temperatures above the glass strain point with sources of exchangeable ions (e.g. lithium) that can modify the composition of the glass to reduce the thermal expansion coefficient thereof. Selecting an appropriate ion-exchange treatment for developing the required surface compression levels in glasses to be treated in accordance with the present disclosure can readily be accomplished through routine experiment.

For demanding applications such as information display screens or display cover sheets, where the article to be treated is, for example, a glass sheet of alkali aluminosilicate composition, the ion-exchange strengthening treatment should be one that is effective to provide a surface compression level of at least 200 MPa in the treated article. Ion-exchange strengthening treatments that substitute relatively large alkali metal ions from a treatment medium for relatively small alkali metal ions from a glass surface at temperatures below the glass strain point can readily provide the required stress levels in glasses such as alkali aluminosilicate glasses. In particular embodiments, that surface compression level will be a residual stress level, i.e., a level that is retained in the surface of the glass sheet or other article even following the ensuing step of removing a glass surface layer to reduce surface flaw levels.

The layer of glass to be removed by etching must be of a thickness effective to reduce the maximum flaw depth in the compressively stressed surface layer to a value not exceeding 2 μm. Generally, removing a layer of glass of a thickness in the range of about 1-5 μm will be adequate for that purpose. A variety of chemicals, concentrations, and treatment times may be used to achieve the removal of surface glass layers of thicknesses in the prescribed range. However, the chemicals selected must effect a relatively rapid and complete dissolution of glass surface material, i.e., a removal of the silica network along with other typical glass constituents such as alumina, boron oxide, and the various metal oxides typically present in glasses. For that purpose the use of fluoride-based etching media is generally required; even strong mineral acids such as nitric acid, sulfuric acid and hydrochloric acid cannot achieve the efficient and complete removal of entire layers of conventional silicate glasses.

Examples of chemicals useful for carrying out removal via acid etching include fluoride-containing aqueous treating media containing at least one active glass etching compound selected from the group consisting of HF, combinations of HF with one or more of HCl, $HNO_3$ and $H_2SO_4$, ammonium bifluoride, alkali metal bifluorides such as sodium bifluoride and others. As one particular example, an aqueous acidic solution consisting of 5 vol. % HF (48%) and 5 vol. % $H_2SO_4$ (98%) in water can achieve the removal of an adequate thickness of surface glass from an ion-exchange-strengthened alkali aluminosilicate glass sheet within treatment times as short as one minute in duration.

A suitable procedure for practicing the above-disclosed methods to provide an ion-exchange-strengthened glass sheet with surface flaw depths below 2 μm in thickness is set forth in the following illustrative example.

Example 1

Finished Aluminosilicate Glass Sheet

A freshly drawn glass sheet of Corning Code 2318 aluminosilicate glass having a thickness of about 1.0 mm is selected for treatment. The surfaces of the sheet are first contacted with an ion-exchange strengthening bath comprising a source of potassium ions that are of larger ionic diameter than the sodium ions present in the surface of the glass as drawn. The surface of the glass sheet is contacted with this bath at a temperature below the strain point of the glass for a time at least sufficient to develop compressive surface layers on the glass sheet that have a depth of about 30 μm and a peak compressive stress level somewhat in excess of 500 MPa.

Following ion-exchange strengthening as above described, the surfaces of the glass sheet are contacted with an etching medium comprising an acidic solution containing a fluoride compound. The etching medium employed is an aqueous solution consisting of 5 vol. % HF (48%) and 5 vol. % H2SO4 (98%) in water. Etching is carried out at room temperature for a treatment interval of about one minute, that time being effective to allow the selected etching medium to remove a layer of surface glass about 2 μm in thickness from the surfaces of the Corning Code 2318 glass sheet. The sheet is then removed from the etching medium, cleaned, and examined.

The combination of ion-exchange strengthening and surface etching carried out as above described is found to be effective to provide a processed sheet of high strength and good optical quality. The sheet retains a residual surface compressive stress level of about 500 MPa yet is substantially free of surface flaws more the 2 μm in depth. In addition, the processed sheet retains light transmission and surface gloss levels that differ by less than 1%, respectively, from the initial light transmission and surface gloss levels of the sheet, as well as a final optical haze level not exceeding 0.1%. These optical properties are of particular value where the sheet is to be used, for example, as a component of an information display device.

Surface-treated glass articles provided in accordance with procedures such as those disclosed in Example 1 above are protected from frictive surface damage through the application of a lubricious surface coating to the surface-treated glass; i.e., a coating that reduces the coefficient of friction between the glass surface and objects coming into sliding contact with that surface. The anti-friction coating is applied after the flaw reduction step, with minimal glass handling between the steps. By combining flaw size reduction with an anti-friction coating, a glass article such as a glass display panel is provided that is much more resistant to breakage as a result of scratching damage than a surface modified by either etching or lubricious coating alone. The increased frictive damage resistance also improves the aesthetics of the glass surface by reducing the amount of visual damage from sliding surface contacts.

A number of surface coating systems that have been developed for application to glass or other surfaces for various purposes can provide sufficient lubricity and chemical and mechanical durability to be useful for this purpose. Among the coatings offering the required combination of properties are fluorine-based amphiphobic coatings such as those recently developed to improve the cleanability of glass surfaces (so-called "easy-to-clean" coatings). A friction-reducing coating of this type is readily provided by applying a coating of a curable formulation for an amphiphobic coating to a surface portion of a glass article from which a surface layer of glass has been removed to reduce surface flawing. Application is generally followed by an appropriate curing of the applied material to set the final properties of the coating.

Fluorine-based amphiphobic coatings that are well suited for use in accordance with the presently disclosed methods include those composed at least predominantly of a silicon compound of the formula $(R_F)_n SiX_{(4-n)}$, wherein $R_F$ is selected from the group consisting of C1-C22 alkyl perfluorocarbons, n is an integer in the range of 1-3, Si is silica, and X is a hydrolyzable group that is exchangeable with terminal glass surface OH groups. In particular embodiments, X is selected from the group consisting of (i) a halogen other than fluorine and (ii) an alkoxy group (—OR) wherein R is a linear or branched hydrocarbon of 1-6 carbon atoms.

The following example illustrates a procedure for applying an amphiphobic surface coating on an etched surface of a chemically strengthened glass article in accordance with the presently disclosed methods.

Example 2

Amphiphobic Coating on Etched Glass

A pristine fusion-drawn sheet of Corning Code 1317 alkali aluminosilicate glass having a thickness of about 0.3 mm is subjected to an ion-exchange strengthening treatment to develop surface compression layers on the opposing surfaces of the sheet. The treatment effects an exchange of K ions from an ion-exchange strengthening bath for Na ions from the glass while the glass is immersed in the bath at a temperature below the glass strain point. Immersion is continued for a time sufficient to develop surface compression layers about 50 µm in thickness and a level of compressive surface stress in excess of 200 MPa on each of the opposing surfaces of the sheet. The sheet is then removed from the bath and washed.

The glass sheet is next immersed in a glass etching medium to remove layers of glass from the opposing surfaces of the sheet as described in Example 1 above. The etching medium employed is an aqueous solution consisting of 5 vol. % HF (48%) and 5 vol. % $H_2SO_4$ (98%) in water. Etching is carried out at room temperature for a treatment interval sufficient to remove a layer of surface glass about 2 µm in thickness from each of the surfaces of the sheet. The sheet is then removed from the etching medium and cleaned.

To provide an amphiphobic friction-reducing coating on the etched surfaces of the glass sheet thus provided, a fluorine-based coating formulation comprising an $(R_F)_n SiX_{(4-n)}$ compound is applied to sheet surfaces by dipping the sheet into a coating bath containing the compound. The formulation used for the coating bath is an alkoxysilyl perfluoropolyether liquid coating formulation commercially available as DC2604 coating liquid from the Dow Corning Corporation, Midland, Mich., USA. The layer of coating liquid thus applied is then cured by heating at 50° C. in an atmosphere containing 50% moisture for 2 hours. Finally the cured coating is solvent rinsed to remove unbound coating material, and then air-dried.

The effectiveness of the resulting amphiphobic coating layer as a friction-reducing coating is indicated by measurements comparing the kinetic coefficient of friction of the coated glass with the same coefficient for uncoated glass. The coefficient of sliding or kinetic friction µK for the uncoated glass is measured at 0.25, while that of the coated glass is measured at 0.05, indicating an 80% reduction in kinetic friction due to the presence of the amphiphobic coating.

Alternative amphiphobic coatings that can be used effectively in the practice of the disclosed methods include those comprising (a) silica-OH group-terminated active glass surface sites exchanged with a fluorine-based monomer; (b) an assembled monolayer of a fluorine-terminating molecular chain; (c) a thin, fluoro-polymeric coating; and (d) silica soot particles derived from or treated to have fluorine termination groups. Further information concerning any of these amphiphobic surfacing materials and optimal methods for their application is set forth in published U.S. patent application No. 2009/0197048, which publication is expressly incorporated by reference herein.

As noted above, a number of other coating systems that have been developed for application to glass, ceramic, or other inorganic surfaces can provide friction-reducing surface layers suitable for the practice of the presently disclosed methods. Included among such systems are (i) hydrophobic coatings deposited from heat-vaporized aqueous surfactant solutions; (ii) covalently bonded coatings comprising at least one organic species selected from the group of silanes, siloxanes, silanols, and cationic phosphonium compounds; (iii) self-assembled monolayer coatings comprising hydrocarbon-functional or fluorocarbon-functional silane monomers or oligomers; and (iv) organic polymeric coatings bonded to the chemically etched surface of the article via van der Waal forces.

Hydrophobic coatings produced by the heat-vaporization of aqueous surfactant solutions have been developed for reducing the adherence of cutting and grinding debris to glass surfaces, but have also been found to offer friction-reducing properties adequate for use in accordance with the present disclosure. Useful solutions include those comprising at least one surfactant selected from the group consisting of cationic surfactants, non-ionic surfactants, and betaines. These surfactant compounds can rapidly organize upon contact with a heated glass surface to form hydrophobic coatings that exhibit sessile water drop contact angles of 40° or more, and that also exhibit good lubricity.

Suitable coatings of these materials are provided, for example, by spraying the surface of a glass article heated to a surface temperature above 175° C. with an aqueous solution containing the selected surfactant at a concentration typically in the range of about $10^{-6}$ moles/liter to 0.5 moles/liter. In particular embodiments surfactant concentrations in the range of about $10^{-4}$ moles/liter to about $10^{-2}$ moles/liter are used. Hexadecyltrimethylammonium bromide is a particular example of a cationic surfactant that can form a lubricious coating when applied in this manner. U.S. Pat. No. 6,379,746, expressly incorporated herein by reference, may be consulted for additional information concerning alternative coatings and alternative methods for applying them.

Another family of coatings having friction-reducing properties are covalently bonded coatings comprising at least one organic species selected from the group of silanes, siloxanes, silanols, and cationic phosphonium compounds. Such coatings can result from the application to an etched glass surface of one of the fluid formulations recently developed for the clean cutting of vitreous materials such as glasses and ceramics. The organic species present in such formulations can covalently bond to etched glass surfaces via surface oxygen substituents present on such surfaces.

Particular examples of silanes useful for the present purpose are organosilanes, siloxanes, or silanols that have molecular substituents selected from among alkyl, phenylated, branched, unbranched, or cyclic carbon groups, as well as oxygen and halides. Such silanes can be applied by a surface application of a silane dispersion in an aqueous detergent solution. A particular example of a commercially available solution is a detergent solution containing 0.5% by weight of a $C_{18}$-hydrocarbon silane $(C_{18}H_{37}Si(OH)_3)$, obtainable as TLF-8291 solution from E. I. DuPont de Nemours, Wilmington, Del., U.S.A. Additional examples are disclosed in U.S. Pat. No. 6,673,752, expressly incorporated by reference herein.

Yet another family of coatings found to impart surface lubricity adequate for use in accordance with the present methods are self-assembled silane-based monolayer coatings of the kind used for preventing particulate contamination of the surfaces of fused silica glass components to be used for drawing glass optical fibers. In particular embodiments, such coatings are formed of one or more silane compounds selected from the group of hydrocarbon silanes, fluorocarbon silanes, epoxy functional silanes, acrylate functional silanes, amine functional silanes, thiol functional silanes, and phenyl functional silanes. A C18-hydrocarbon silane such as present in commercially available formulations such as DuPont's TLF-8291 formulation can readily form such a self-assembled layer when applied from solution to the surface of a fused silica-based optical fiber preform.

U.S. Pat. No. 6,767,579, the disclosure of which is expressly incorporated herein by reference, discloses further examples of silanes capable of forming self-assembled layers such as above described. In addition, that patent discloses polymeric coatings that can serve as friction-reducing lubricious coatings in accordance with the present disclosure. The latter are organic polymeric coatings that will bond to the chemically etched surface of a glass article via van der Waal forces following the fluoride treatment of that surface to reduce the surface flaw population thereof. Particular examples of suitable polymers that can provide well bonded friction-reducing surface layers include acrylate polymers, polyvinyl alcohol, and waxes such as ethylenebissteramide.

The practice of the foregoing methods enables the production of glass articles, particularly including glass sheets, that offer high resistance to frictive surface damage and that are thus well suited for applications such as glass components for information displays. The characteristics of such articles include a glass substrate having a chemically etched surface free of deep surface flaws, i.e., free of surface flaws of a depth exceeding about 2 µm, and a friction-reducing coating disposed on the etched surface that may be selected from among a variety of different lubricious coating systems.

In particular embodiments, the glass article will be provided with a friction-reducing coating is a coating selected from the group consisting of (a) coatings comprising an amphiphobic fluorine-based surface layer chemically bonded to the surface of the glass substrate; (b) hydrophobic coatings deposited from heat-vaporized aqueous surfactant solutions; (c) covalently bonded coatings comprising at least one organic species selected from the group of silanes, siloxanes, silanols, and cationic phosphonium compounds; (d) self-assembled monolayer coatings comprising hydrocarbon-functional or fluorocarbon-functional silane monomers or oligomers; and (e) organic polymeric coatings bonded to the chemically etched surface via van der Waal forces.

In articles wherein the friction-reducing coating comprises an amphiphobic fluorine-based surface layer chemically bonded to the surface of the glass substrate, the bonded surface layer can be selected from the group consisting of (i) silica —OH group-terminated active surface sites exchanged with a fluorine-based monomer; (ii) an assembled monolayer of a fluorine-terminating molecular chain; (iii) a thin, fluoro-polymeric coating; (iv) a silicon compound of general formula (RF)nSiX4–n, where RF is a perfluorocarbon moiety, X is selected from the group consisting of a non-fluorine halogen and a C2-C6 alkoxy group, and n is in the range of 1-3; and (v) silica soot particles derived from or treated to incorporate fluorine termination groups.

A number of information display applications require glass sheets that exhibit particularly high resistance to impact damage as well as fictive surface damage. Embodiments of the present disclosure wherein the glass substrate comprises an alkali aluminosilicate glass sheet are particularly well suited for such applications, especially where the glass sheet is ion-exchange strengthened to a level such that it incorporates at least one surface portion having a surface compressive stress of at least about 200 MPa as well as a surface compressive layer depth in the range of 20-80 µm. Embodiments wherein the glass sheet has a surface compressive stress of at least about 600 MPa, and wherein the surface compressive layer depth is at least 40 µm, and wherein the glass sheet has a thickness in the range of 0.7-1.1 mm, are of particular interest for such applications.

While the presently disclosed methods and articles have been described above with reference to particular examples of materials, product designs and procedures, it will be recognized that those examples have been presented for purposes of illustration only, and that a wide variety of alternative materials, designs and procedures may be adapted for use in the practice of the present disclosure within the scope of the appended claims.

What is claimed is:
1. A glass article comprising:
    a. a glass substrate comprising at least one surface portion having a surface compressive stress and a chemically etched surface, wherein the chemically etched surface is free of surface flaws of a depth exceeding 2 µm; and
    b. a friction-reducing coating disposed on the etched surface, wherein the friction reducing coating is a coating selected from the group consisting of (a) coatings comprising an amphiphobic fluorine-based surface layer chemically bonded to the surface of the glass substrate; (b) hydrophobic coatings deposited from heat-vaporized aqueous surface solutions; (c) covalently bonded coatings comprising at least one organic species selected from the group of silanes, siloxanes, silanols, and cationic phosphonium compounds; (d) self-assembled monolayer coatings comprising hydrocarbon-functional or fluorocarbon-functional silane monomers or oligomers; and (e) organic polymeric coatings bonded to the chemically etched surface via van der Waal forces, wherein the organic polymeric coatings comprise at least one of acrylate polymer, polyvinyl alcohol and ethylenebissteramide;

wherein the glass article suffers no frictive damage following sliding surface contact by a 2 mm ball point stylus under a 20 kilogram load.

2. The glass article in accordance with claim 1 wherein the friction-reducing coating comprises an amphiphobic fluorine-based surface layer chemically bonded to the surface of the glass substrate.

3. The glass article in accordance with claim 2 wherein the fluorine-based surface layer is selected from the group consisting of:
   a. silica —OH group-terminated active surface sites exchanged with a fluorine-based monomer;
   b. an assembled monolayer of a fluorine-terminating molecular chain;
   c. a thin, fluoro-polymeric coating;
   d. a silicon compound of general formula $(R_F)_n SiX_{4-n}$, where $R_F$ is a perfluorocarbon moiety, X is selected from the group consisting of a non-fluorine halogen and a C2-C6 alkoxy group, and n is in the range of 1-3; and
   e. silica soot particles derived from or treated to incorporate fluorine termination groups.

4. The glass article in accordance with claim 1 wherein the glass substrate comprises an alkali aluminosilicate glass sheet.

5. The glass article in accordance with claim 4 wherein the surface compressive stress is at least about 200 MPa and has surface compressive layer depth in the range of 20-80 μm.

6. The glass article in accordance with claim 5 wherein the surface compressive stress is at least about 600 MPa.

7. The glass article in accordance with claim 6 wherein the surface compressive layer depth is at least 40 μm, and wherein the glass sheet has a thickness in the range of 0.7–1.1 mm.

8. The glass article in accordance with claim 1 wherein the glass article has a kinetic coefficient of friction less than or equal to 0.05.

\* \* \* \* \*

UNITED STATES PATENT AND TRADEMARK OFFICE
CERTIFICATE OF CORRECTION

PATENT NO. : 10,155,689 B2
APPLICATION NO. : 15/134569
DATED : December 18, 2018
INVENTOR(S) : Timothy Michael Gross Page 1 of 1

It is certified that error appears in the above-identified patent and that said Letters Patent is hereby corrected as shown below:

In the Claims

In Column 10, Line 67, Claim 1, delete "ethylenebisstreamide;" and insert -- ethylenebisstearamide; --, therefor.

Signed and Sealed this
Eighth Day of July, 2025

Coke Morgan Stewart
*Acting Director of the United States Patent and Trademark Office*